(12) United States Patent
Louh

(10) Patent No.: US 8,070,991 B2
(45) Date of Patent: Dec. 6, 2011

(54) METHOD OF MOLDING LENS ARRAY

(75) Inventor: Sei-Ping Louh, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 209 days.

(21) Appl. No.: 12/639,154

(22) Filed: Dec. 16, 2009

(65) Prior Publication Data
US 2010/0295195 A1    Nov. 25, 2010

(30) Foreign Application Priority Data

May 22, 2009   (CN) .......................... 2009 1 0302541

(51) Int. Cl.
*B29D 11/00* (2006.01)
(52) U.S. Cl. .............. 264/1.7; 264/2.2; 264/2.7
(58) Field of Classification Search .............. 264/1.1, 264/1.7, 1.36, 1.38, 2.2, 2.4, 2.7, 236, 347; 425/808
See application file for complete search history.

(56) References Cited

U.S. PATENT DOCUMENTS

| | | | | |
|---|---|---|---|---|
| 4,113,224 A | * | 9/1978 | Clark et al. | 249/105 |
| 5,252,056 A | * | 10/1993 | Horner et al. | 425/555 |
| 5,466,147 A | * | 11/1995 | Appleton et al. | 425/412 |
| 5,782,460 A | * | 7/1998 | Kretzschmar et al. | 264/1.36 |
| 6,800,225 B1 | * | 10/2004 | Hagmann et al. | 264/1.36 |

* cited by examiner

*Primary Examiner* — Mathieu D. Vargot
(74) *Attorney, Agent, or Firm* — Altis Law Group, Inc.

(57) ABSTRACT

An exemplary method for making a lens array having many lenses includes the follow steps. A light pervious substrate including a supporting surface is firstly provided. Secondly, a molten molding material is applied on the supporting surface. Thirdly, a pressing mold including many molding parts is provided, each molding part including a molding cavity for molding the lens. Fourthly, the pressing mold is pressed on the molten molding material. Fifthly, the molten molding material is half-cured, thereby forming a half-cured molding material. Sixthly, the half-cured molding material is pressed by the pressing mold. Seventhly, the half-cured molding material is fully cured to form each lens in each molding cavity. Finally, the pressing mold is removed from the light pervious substrate to form the lens array.

15 Claims, 7 Drawing Sheets

METHOD OF MOLDING LENS ARRAY

BACKGROUND

1. Technical Field

The present disclosure relates to lens arrays, and particularly to a method for molding a lens array using a pressing mold.

2. Description of Related Art

A conventional method for molding a lens array typically includes the following steps. Firstly, a light pervious substrate is provided. Secondly, a pressing mold having a plurality of spaced concave molding cavities is provided. Thirdly, a thermosetting material is applied on a surface of the light pervious substrate. Fourthly, the thermosetting material is pressed by the pressing mold with the molding cavities facing the thermosetting material, thereby filling the molding cavities with the thermosetting material. Fifthly, the thermosetting material is fully cured. Finally, the pressing mold is removed from the light pervious substrate, thus the lens array, including the light pervious substrate and a plurality of convex lenses formed on the surface of the light pervious substrate, is formed.

However, when cured, the thermosetting material shrinks, and usually the shrinkage percentage of the thermosetting material is about 6 percent. Therefore, curvature of the lenses may not be identical with the designed curvatures of the molding cavities. The production quality of the convex lenses is thus sub-standard.

Therefore, what is needed is a new method of molding a lens array which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Embodiments will now be described in detail below with reference to the drawings.

Figure 1:
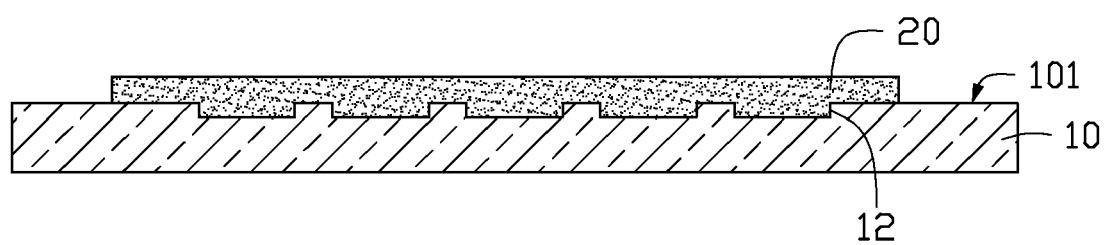
FIGS. 1-6 show successive stages of making a lens array according to a first embodiment.

Referring to FIG. 1, a light pervious substrate 10 is firstly provided. The light pervious substrate 10 includes a supporting surface 101.

A plurality of spaced recesses 12 are formed in the supporting surface 101 by etching, e.g., sputter etching or ion beam etching. In the present embodiment, the recesses 12 are arranged in an array, e.g. in columns and rows. In alternative embodiments, the recesses 12 may be omitted.

Figure 6:
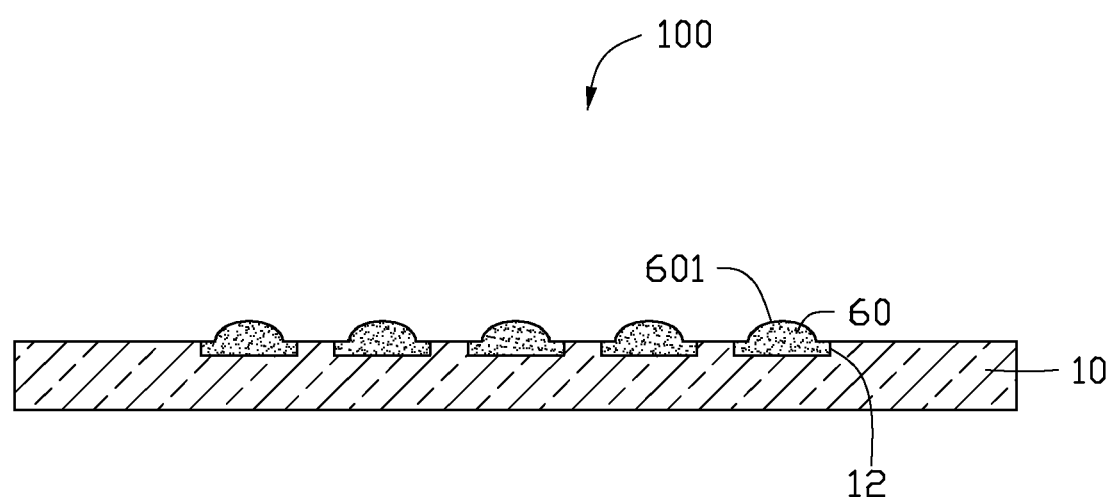

A molten molding material 20 is applied on the supporting surface 101 in the recesses 12 by coating, e.g., spin coating, or spray coating. The molten molding material 20 can be thermoplastic material or thermosetting material. A volume of the molten molding material 20 is greater than a total volume of lenses 60 (see. FIG. 6). That is, if the volume of each lens 60 is v, and the number of the lenses is n, the volume of the molten molding material 20 should be more than n×v. In the present embodiment, shrinkage of the molten molding material 20 is about 6 percent, and the volume of the molten molding material 20 should be more than 1.1n×v.

Figure 2:
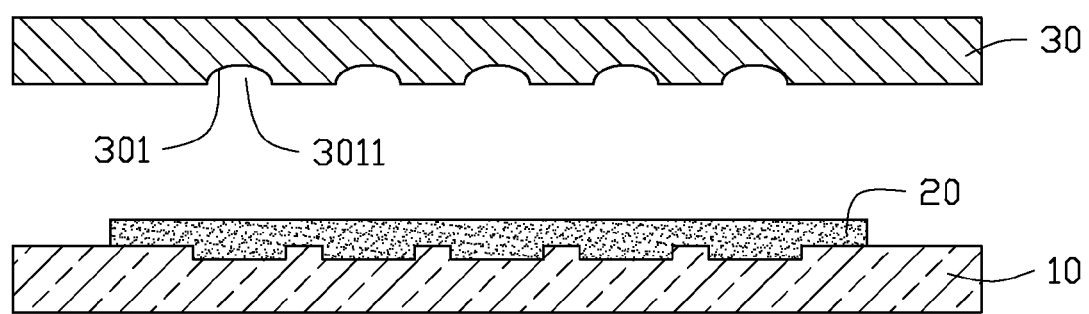

Referring also to FIG. 2, a pressing mold 30 is then provided. The pressing mold 30 includes a plurality of molding parts 301 corresponding to the plurality of recesses 12. Each molding part 301 has a molding cavity 3011 for molding an optically active part 601 of each lens 60 (see FIG. 6).

Figure 3:
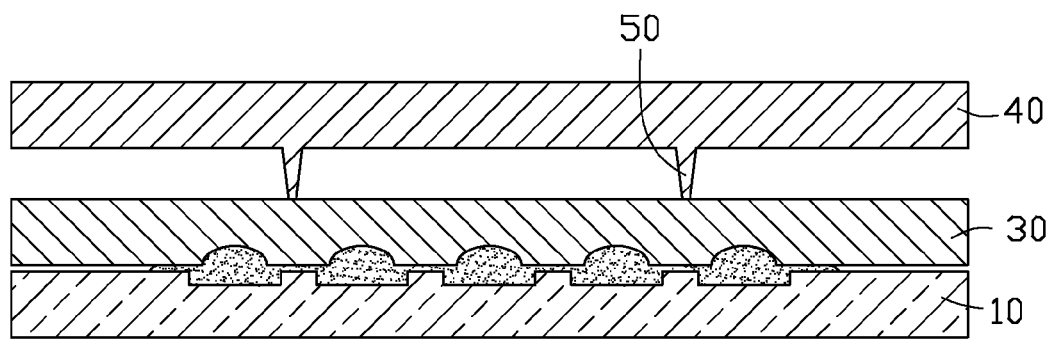

Referring also to FIG. 3, the molten molding material 20 is evenly pressed by the pressing mold 30 under a first pressure, for molding the molten molding material 20 in the molding cavities 3011. In the present embodiment, a pressing plate 40 with a plurality of elastic members 50 (e.g. springs) is provided for supplying a pressure on the pressing mold 30, such that the pressure can be adjusted with deformation adjustment of the elastic members 50.

Figure 4:
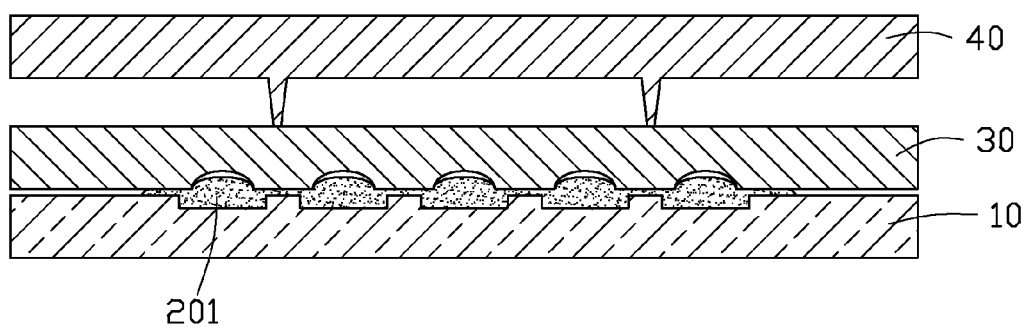

Referring also to FIG. 4, the molten molding material 20 is half-cured at a first temperature, thereby forming a half-cured molding material 201 between the pressing mold 30 and the light pervious substrate 10. The first temperature is in a range from 50 Celsius degrees to 70 Celsius degrees. In the first curing process, the molten molding material 20 shrinks. Therefore, a small space (not labeled) is defined between the half-cured molding material 201 in each molding cavity 3011 and the corresponding molding cavity 3011. In the present embodiment, the first temperature is 55 Celsius degrees.

Figure 5:
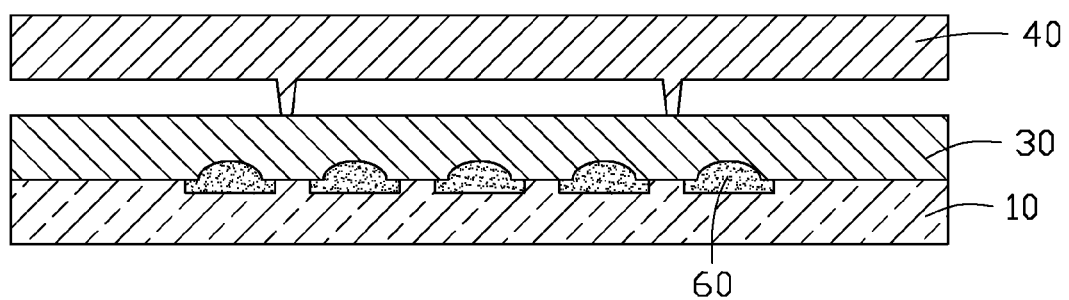

Referring also to FIG. 5, the half-cured molding material 201 is evenly pressed by the pressing mold 30 with a second pressure. Therefore, the small space between the half-cured molding material 201 in each molding cavity 3011 and the corresponding molding cavity 3011 formed in first curing process is substantially filled by the half-cured molding material 201 in the pressing process. The first and second pressures need not be the same and can be adjusted as needed according to the nature of the molten molding material 20 used. That is, deformation of the elastic members 50 may be adjusted. In the present embodiment, the first pressure is less than the second pressure.

Then, the half-cured molding material 201 is fully cured at a second temperature higher than the first temperature, thereby forming the lenses 60 in the molding cavities 3011, respectively. The second temperature is in a range from 90 Celsius degrees to 110 Celsius degrees. In the present embodiment, the second temperature is 105 Celsius degrees. It should be noted that there will usually be some fully cured molding material on the supporting surface 101, but for more clearly showing the lenses 60, it is not shown.

Referring also to FIG. 6, the pressing mold 30 is removed from the light pervious substrate 10 to form a lens array 100. The lens array 100 includes the light pervious substrate 10, and a plurality of lenses 60 arranged in the respective recesses 12 of the light pervious substrate 10.

In the process for molding the lens array 100, the lenses 60 are made of the molten molding material 20, the beginning volume of which is larger than the total volume of the lenses 60. By doing the final curing in steps, spaces formed in the molding cavities 3011 during half-curing due to shrinkage can be filled. Thus the lenses 60 formed after the final curing fully fill the respective molding cavities 3011 to obtain the desired curvatures.

Figure 7:
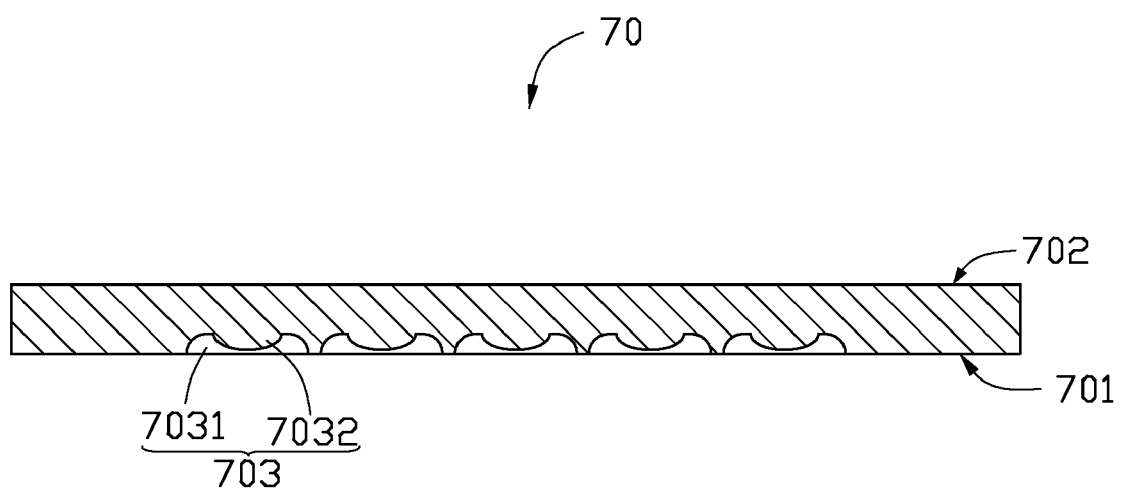
FIG. 7 is a cross-sectional view of a pressing mold for making a lens array according to a second embodiment.

Referring to FIG. 7, a pressing mold 70 for making a lens array (not shown), in accordance with a second embodiment, is shown. The pressing mold 70 is similar to the pressing mold 30, except that, the pressing mold 70 is configured for molding concave lenses (not shown). The pressing mold 70 includes a first surface 701, an opposite second surface 702, and a plurality of molding parts 703 defined in the molding surface 701. Each molding part 703 has a molding cavity 7031, and a convex molding portion 7032 arranged in the center of the molding cavity 7031. Each convex molding portion 7032 is configured for molding an optically active part of each concave lens. Each convex molding portion 7032 is located between the first and second surfaces 701, 702, such that the molding cavities 7031 can be substantially filled with the molten molding material 20 cured as above in the first embodiment.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope of the appended claims.

What is claimed is:

1. A method for making a lens array having a plurality of lenses, comprising:
    providing a light pervious substrate, the light pervious substrate comprising a supporting surface;
    applying a molten molding material on the supporting surface;
    providing a pressing mold, the pressing mold comprising a plurality of spaced molding parts, each molding part comprising a molding cavity for molding an optically active portion of each lens;
    pressing the pressing mold on the molten molding material with a first pressure, for molding the molten molding material in the molding cavities;
    half-curing the molten molding material at a first temperature, thereby forming a half-cured molding material between the pressing mold and the light pervious substrate;
    pressing the pressing mold on the half-cured molding material with a second pressure;
    fully curing the half-cured molding material at a second temperature to form the lenses in molding cavities, the second temperature being higher than the first temperature; and
    removing the pressing mold from the light pervious substrate to form the lens array, the lens array comprising the light pervious substrate and the lenses.

2. The method of claim 1, wherein the light pervious substrate further comprises a plurality of spaced recesses defined in the supporting surface, and the molten molding material is applied on the supporting surface in the recesses.

3. The method of claim 1, wherein a volume of the molten molding material is 1.1 times greater than a total volume of the lenses.

4. The method of claim 1, wherein the first temperature is in a range from 50 Celsius degrees to 70 Celsius degrees.

5. The method of claim 1, wherein the second temperature is in a range from 90 Celsius degrees to 110 Celsius degrees.

6. The method of claim 1, wherein the pressing mold comprises a first surface, an opposite second surface, and a convex molding portion arranged in the center of each molding cavity, each convex molding portion is located between the first and second surfaces.

7. The method of claim 1, wherein the molten molding material is thermoplastic material, or a.

8. The method of claim 1, wherein the first pressure is less than the second pressure.

9. A method for making a lens array having a plurality of lenses, comprising:
    providing a light pervious substrate, the light pervious substrate comprising a supporting surface;
    applying a molten molding material on the supporting surface;
    providing a pressing mold, the pressing mold comprising a first surface, an opposite second surface, and a plurality of spaced molding parts defined in the first surface, each molding part comprising a molding cavity, and a concave molding portion for molding an optically active portion of each lens, each concave molding portion being located between the first and second surfaces;
    pressing the pressing mold on the molten molding material with a first pressure, for molding the molten molding material in the molding cavities;
    half-curing the molten molding material at a first temperature, thereby forming a half-cured molding material between the pressing mold and the light pervious substrate;
    pressing the pressing mold on the half-cured molding material with a second pressure;
    fully curing the half-cured molding material at a second temperature to form the lenses in molding cavities, the second temperature being higher than the first temperature; and
    removing the pressing mold from the light pervious substrate to form the lens array, the lens array comprising the light pervious substrate and the lenses.

10. The method of claim 9, wherein the light pervious substrate further comprises a plurality of spaced recesses defined in the supporting surface, and the molten molding material is applied on the supporting surface in the recesses.

11. The method of claim 9, wherein a volume of the molten molding material is 1.1 times greater than a total volume of the lenses.

12. The method of claim 9, wherein the first temperature is in a range from 50 Celsius degrees to 70 Celsius degrees.

13. The method of claim 9, wherein the second temperature is in a range from 90 Celsius degrees to 110 Celsius degrees.

14. The method of claim 9, wherein the molten molding material is thermoplastic material or a.

15. The method of claim 9, wherein the first pressure is less than the second pressure.

* * * * *